(12) United States Patent
Williams et al.

(10) Patent No.: US 11,397,344 B2
(45) Date of Patent: Jul. 26, 2022

(54) SWITCHABLE GLAZING UNIT

(71) Applicant: PILKINGTON GROUP LIMITED, Lathom (GB)

(72) Inventors: Jonathan Mark Williams, Southport (GB); Joseph Jeremy Boote, Wigan (GB)

(73) Assignee: Pilkington Group Limited, Lathom (GB)

( * ) Notice: Subject to any disclaimer, the term of this patent is extended or adjusted under 35 U.S.C. 154(b) by 20 days.

(21) Appl. No.: 16/326,392

(22) PCT Filed: Aug. 18, 2017

(86) PCT No.: PCT/GB2017/052455
§ 371 (c)(1),
(2) Date: Feb. 19, 2019

(87) PCT Pub. No.: WO2018/033752
PCT Pub. Date: Feb. 22, 2018

(65) Prior Publication Data
US 2019/0227357 A1     Jul. 25, 2019

(30) Foreign Application Priority Data
Aug. 19, 2016   (GB) .................................... 1614208

(51) Int. Cl.
*G02F 1/1333* (2006.01)
*G02F 1/1339* (2006.01)
(Continued)

(52) U.S. Cl.
CPC ...... *G02F 1/1333* (2013.01); *B32B 17/10504* (2013.01); *G02F 1/1339* (2013.01);
(Continued)

(58) Field of Classification Search
None
See application file for complete search history.

(56) References Cited

U.S. PATENT DOCUMENTS 5,076,673 A * 12/1991 Lynam .................... G02F 1/153
                                            359/271
5,263,888 A    11/1993 Ishihara et al.
(Continued)

FOREIGN PATENT DOCUMENTS

EP         2764998 A1    8/2014
WO     WO98/05998 A1    2/1998
(Continued)

OTHER PUBLICATIONS

European Patent Office, International Search Report with Written Opinion, issued in PCT/GB2017/052455, dated Dec. 26, 2017, 15 pages, European Patent Office, Rijswijk, Netherlands.
(Continued)

*Primary Examiner* — Phu Vu
(74) *Attorney, Agent, or Firm* — Marshall & Melhorn, LLC

(57) ABSTRACT

A switchable glazing unit comprising a glazing panel spaced apart from a pane of glazing material by a perimeter seal is described. The glazing panel comprises first and second glass sheets. A first electrode layer is on a first major surface of the first glass sheet and a second electrode layer is on a first major surface of the second glass sheet. A layer of liquid crystal material is between the first electrode layer and the second electrode layer. When no voltage is applied to the first and second electrode layers, the liquid crystal layer has a first opacity, and upon applying a suitable voltage between the first and second electrode layers, the liquid crystal layer has a second opacity different to the first opacity. Methods of making such a switchable glazing unit are also described.

21 Claims, 3 Drawing Sheets

(51) Int. Cl.
  *B32B 17/10* (2006.01)
  *G02F 1/1347* (2006.01)
  *E06B 3/663* (2006.01)

(52) U.S. Cl.
  CPC ...... *G02F 1/1347* (2013.01); *B32B 2307/306* (2013.01); *B32B 2307/40* (2013.01); *B32B 2315/08* (2013.01); *B32B 2419/00* (2013.01); *B32B 2605/006* (2013.01); *E06B 2003/6638* (2013.01); *G02F 1/133311* (2021.01); *G02F 2201/50* (2013.01); *G02F 2202/28* (2013.01); *G02F 2203/62* (2013.01)

(56) References Cited

U.S. PATENT DOCUMENTS

| | | | |
|---|---|---|---|
| 6,474,104 B1 | 11/2002 | Campbell et al. | |
| 6,543,903 B2 | 4/2003 | Akimoto et al. | |
| 7,154,657 B2 | 12/2006 | Poll et al. | |
| 8,482,837 B2 | 7/2013 | Sbar et al. | |
| 8,482,838 B2 | 7/2013 | Sbar et al. | |
| 8,934,078 B2 | 1/2015 | Gayout et al. | |
| 9,120,970 B2 | 9/2015 | Archetti et al. | |
| 9,182,644 B2 | 11/2015 | Sbar et al. | |
| 9,316,883 B2 | 4/2016 | Sbar et al. | |
| 9,400,411 B2 | 7/2016 | Poix et al. | |
| 9,406,822 B2 | 8/2016 | Bamber et al. | |
| 9,470,928 B2 | 10/2016 | Kim et al. | |
| 9,645,433 B2 | 5/2017 | Mennig | |
| 9,778,533 B2 | 10/2017 | Bertolini | |
| 9,791,759 B2 | 10/2017 | Gayout et al. | |
| 9,891,454 B2 | 2/2018 | Zhang et al. | |
| 2011/0001902 A1 | 1/2011 | Ikadai et al. | |
| 2013/0093969 A1* | 4/2013 | Li | G02F 1/13718 349/16 |
| 2013/0312341 A1 | 11/2013 | Gy | |
| 2015/0346574 A1 | 12/2015 | Collins | |
| 2016/0187753 A1 | 6/2016 | Sbar et al. | |
| 2017/0275197 A1* | 9/2017 | Altman | C03B 33/091 |
| 2018/0299741 A1* | 10/2018 | Giron | C03B 33/04 |

FOREIGN PATENT DOCUMENTS

| | | |
|---|---|---|
| WO | WO98/56725 A1 | 12/1998 |
| WO | WO2011/109688 A1 | 9/2011 |
| WO | WO2012/056240 A2 | 5/2012 |

OTHER PUBLICATIONS

U.K. Intellectual Property Office, GB Search Report, issued in earliest claimed priority GB1614208.5, dated Feb. 17, 2017, 2 pages, U.K Intellectual Property Office, Newport, South Wales.

\* cited by examiner

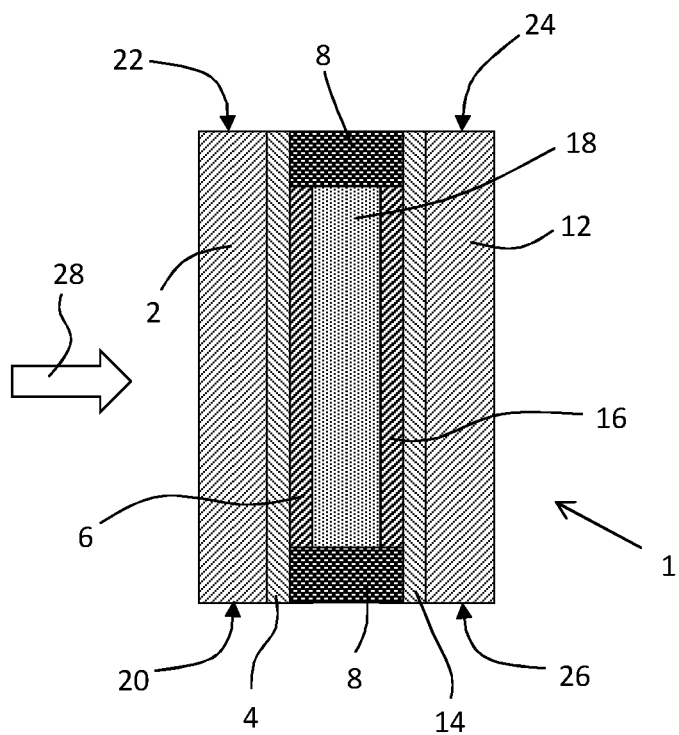
Fig. 1
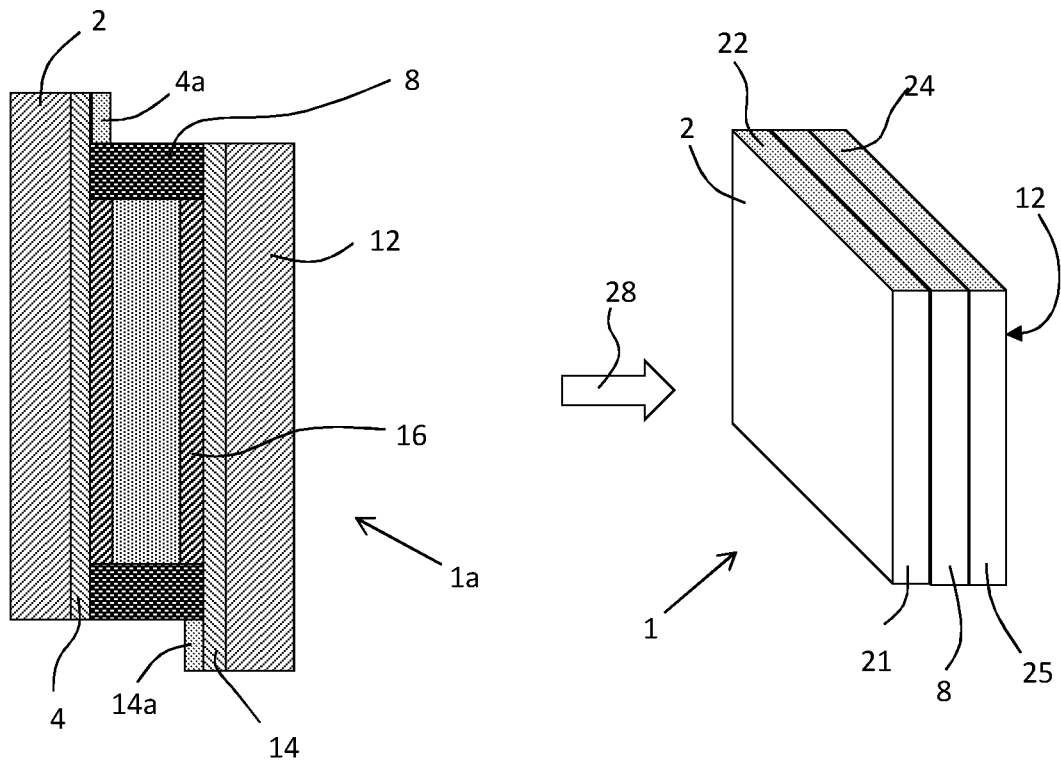
Fig. 2
Fig. 3

SWITCHABLE GLAZING UNIT

BACKGROUND OF THE INVENTION

The present invention relates to a switchable glazing unit comprising a glazing panel spaced apart from a pane of glazing material by a perimeter seal and to methods for making such a switchable glazing unit.

Various technologies are known to provide a switchable window for a building or a vehicle. These include electrochromic coatings, suspended particle device films and liquid crystals. Such technologies provide the ability to switch the opacity of the window to visible light.

Each technology, whilst being able to provide a switchable window, utilises different materials having different properties, requiring unique solutions to similar technical problems.

For example electrochromic technology typically uses an "electrochromic stack", essentially a multilayer coating deposited by a deposition technique onto a suitable substrate. As is well known in the art, such multilayer coatings adhere well to the underlying substrate. In such devices the switchable component has maximum peripheral dimensions determined essentially by the area of the multilayer coating on the substrate. It is possible to cut smaller electrochromic devices from a larger electrochromic device precursor as described in WO2011/109688A1.

Similarly, when using suspended particle devices (SPD) in film form, the dimensions of the SPD film define the dimensions of the switchable component. Liquid crystal films are also known that are switchable due to the amount of scattering through the film. For either of these technologies to provide a switchable glazing panel a film of desired size is manufactured and then incorporated into the glazing.

Other windows having variable, controllable transparency are known in the art.

EP2764998A1 describes a window construction comprising a laminated window glazing having electrically switchable layer means arranged in a laminate, and controlling means being coupled to the switchable layer means for controlling the sunlight transparency of the switchable layer means.

US2015/0277165A1 describes a multiple-pane insulating glazing unit that may include multiple panes of transparent material and a layer of electrically controllable optically active material that provides controllable privacy for the glazing unit.

US2015/0301367A1 describes a glazing having electrically adjustable properties that includes an outer pane and an optically adjustable element which is connected to the outer pane in a planar fashion via at least one thermoplastic film, wherein the thermoplastic film contains at least one luminescent material.

US2013/0265511A1 and US2015/0098037A1 describe multiple glazings including first and second glass sheets and a liquid crystal layer therebetween.

For certain switchable technologies, it is necessary to construct a suitable cell in which to incorporate the switchable material. For example, using a liquid crystal material incorporating a dichroic dye it is possible to use the well-known Guest-Host behaviour of the liquid crystal/dye mixture. In such cells, the dichroic dye is switchable with the orientation of the liquid crystal molecules, thereby having a different absorption to visible light depending upon the orientation of the liquid crystal molecules.

Such cells are typically constructed as follows. First a sheet of glass having a transparent electrically conductive coating (TCO) on an entire major surface thereof is provided. An alignment layer is provided on the TCO to ensure the correct alignment of the liquid crystal molecules with respect to the plane of the first sheet of glass i.e. by rubbing a polyimide layer in a first direction. A physical barrier is provided on the TCO to provide a volume in which the liquid crystal material is to be contained. A second sheet of glass having a TCO on an entire major surface thereof is then provided. The TCO on the second sheet of glass is then treated with an alignment layer in the same way as the first sheet and placed on top of the barrier such that the TCO on the second sheet of glass faces the TCO on the first sheet of glass. Typically the alignment layer on the first sheet of glass has been rubbed in a first direction and the alignment layer on the second sheet has been rubbed in a second direction, and when the second sheet is placed on the first sheet, the first direction of rubbing is perpendicular to the second direction of rubbing.

The first sheet of glass is then fixed to the second sheet of glass by suitable adhesive means, which may be at least in part by the barrier. Suitably sized spacers located inboard of the barrier, and/or within the barrier itself, help maintain the desired spacing between the first and second glass sheets.

SUMMARY OF THE INVENTION

A suitable opening is left in the barrier through which the liquid crystal material may be introduced, for example by vacuum filling. Once the required amount of material is introduced into the void, the opening in the barrier is sealed.

By applying a suitable voltage between the TCO layers on the first and second sheets of glass, the orientation of the liquid crystal molecules with respect to the glass sheets can be varied.

Depending on the nature of the specific liquid crystal material, and the desired properties of the switchable glazing, various changes may be made to the cell manufacturing process. For example, a homeotropic alignment liquid crystal film is described in US2006/0127603A1 without a separate alignment layer. US2013/0114034A1 also describes liquid crystal material that may be used in a cell without an alignment layer. The cell may be constructed using the method described in WO98/05998A1, or using a one-drop filling (ODF) method, see for example U.S. Pat. No. 5,263,888. Using the ODF method it is not necessary to leave a gap in the barrier because the liquid crystal material is positioned in the region bounded by the barrier before the second sheet of glass is placed on the barrier.

A typical cell gap i.e. the spacing of the first and second glass sheets in the example above, is less than 100 μm, typically less than 50 μm, the actual cell gap being dependent at least in part on the nature of the liquid crystal material and the properties required. Typically the aim is for the two glass sheets to be spaced apart such that the opposing major surfaces are in a parallel configuration. As such, any flatness variation in either of the glass sheets used to form the liquid crystal cell will result in a non-uniform cell gap across the entire switchable area, with the potential for a non-uniform appearance, in particular in the dark state. For regions of the cell where the cell gap is less than that desired, the transmission of visible light through such regions is greater because there is less optical absorption. Conversely, for regions of the cell where the cell gap is greater than that desired, the transmission of visible light through such regions is less because there is more optical absorption.

It is therefore desirable to use a glass sheet having as flat a surface as possible in order to reduce the potential variation of the cell gap.

As such it is desirable to use glass that has been made using a process that produces flat surfaces, such as the well-known float process. Other commercial processes are known that produces glass sheets with flat surfaces, such as vertical down-draw processes, and rolling, with each process providing a flatness characteristic of the glass forming process.

It is known to polish at least one surface of a glass substrate to provide a predetermined surface roughness is 0.05 µm or less on the measurement condition that the cut-off value is 0.8 mm to 8 mm, see US2001/004283A1. It is also known from WO2012/056240A2 that by using a polishing step using at least one brush, the height of spikes inherent to a conductive coating on a substrate may be reduced without affecting the general roughness of the coating. WO98/56725A1 describes polishing the coated surface of a float glass ribbon using at least one rotating polishing head. However it is often not desirable to use any type of polishing processing on the glass surface because this additional process adds to costs and complexity.

As is well known, glass made using the float process is formed on the surface of a bath of molten tin. The glass ribbon thus formed is cut into sheets, usually using mechanical scoring and snapping of the glass sheets for later use and/or processing.

The "waviness" of float glass has been discussed in US2011/0001902A1, U.S. Pat. No. 8,934,078B2 and US2014/0375915A1.

Given that it is not possible to cut the cell used to contain the liquid crystal material to size following construction thereof (because the liquid crystal material may escape as the barrier is breached), the size of the glass sheets used to construct the liquid crystal cell are typically cut from larger glass sheets as required, and are of a size required to make the final switchable window. It is also possible to prepare more than one liquid crystal cell on a large mother sheet and to cut out the individual cells after positioning a corresponding sheet on the mother sheet. In both cases, the final cells once produced cannot be further cut to reduce the dimensions of the switchable area of the cell because the barrier will be breached allowing liquid crystal material to be lost.

The skilled person is aware an important consideration for a window for a building is the potential thermal stress that may be developed in the glass sheet or sheets upon uneven heating of the glass sheet of sheets, a particular problem for windows having an optically dark state. Thermal stress may be induced in a window for a building when one part of the window expands when heated, and another part resists expansion because the window is cooler. For example, the window may be partly shaded from the sun, in particular at edges regions due to the framing system employed, giving rise to non-uniform heating of the window. When the stress generated in the glass sheet is greater than the edge strength of the glass, a thermal fracture is likely to occur.

The skilled person is aware that it is conventional to use a thermally toughened sheet of glass instead of an annealed sheet of glass to improve the resistance to thermal breakage.

However the need to utilise toughened glass reduces the flexibility of the manufacture of the liquid crystal cell. For example, an additional process is required to first thermally toughen the glass sheets. Also, once a glass sheet has been thermally toughened it is not possible thereafter to cut the toughened glass sheet by mechanical means so there is less flexibility in the manufacturing process. Furthermore thermal toughening of a glass sheet has been found to introduce additional flatness variations in the sheet surface such as roller wave distortion, see for example "Glass Processing Days, 18-21 Jun. 2001, pages 226-230". The flatness variation in thermally toughened glass may affect the ability to switch the liquid crystal material in the cell uniformly.

The present invention aims at least partially to overcome the above mentioned problems.

Accordingly the present invention provides from a first aspect a switchable glazing unit comprising at least one (a first) glazing panel and at least one (a first) pane of glazing material, the first glazing panel being spaced apart from the first pane of glazing material by a perimeter seal, wherein the first glazing panel comprises a first sheet of glass, a second sheet of glass and a layer of liquid crystal material, the first sheet of glass having a first major surface, a second opposing major surface and at least one (a first) edge between the first and second major surfaces of the first sheet of glass; the second sheet of glass having a first major surface, a second opposing major surface and at least one (a first) edge between the first and second major surfaces of the second sheet of glass; there being a first electrode layer on at least a portion of the first major surface of the first sheet of glass and a second electrode layer on at least a portion of the first major surface of the second sheet of glass; wherein the layer of liquid crystal material is between the first electrode layer and the second electrode layer, the first and second electrode layers being connectable to an electrical power supply; further wherein when no voltage is applied to the first and second electrode layers, the liquid crystal layer has a first opacity, and upon applying a suitable voltage between the first and second electrode layers, the liquid crystal layer has a second opacity different to the first opacity.

In the art such a switchable glazing unit is often referred to as an insulated glazing unit or IGU. Having a perimeter seal provides the switchable glazing unit with a space between the first glazing panel and the first pane of glazing material. The perimeter seal defines the periphery of the space between the first glazing panel and the first pane of glazing material, with opposite facing major surfaces of the first glazing panel and the first pane of glazing material facing the space. The space between the opposing major surfaces of the first glazing panel and the first pane of glazing material bounded by the perimeter seal may be a low pressure space, or may be an air space that may be filled with an inert gas such as argon.

Different processes in the layer of liquid crystal can lead to an increased opacity in the visible region of the electromagnetic radiation spectrum including absorption, reflection and scattering.

Preferably the first edge of the first sheet of glass has an edge strength greater than 50 MPa.

By constructing the switchable glazing unit such that the first sheet of glass of the first glazing panel has a first edge having an edge strength greater than 50 MPa, the resistance to thermal breakage of the switchable glazing unit has been improved compared to an equivalent switchable glazing unit made with identical component parts with the exception of the first sheet of the glass of the first glazing panel having a first edge with an edge strength less than 50 MPa.

Within the context of the present invention an edge of a sheet is a minor surface connecting the two major surfaces of the sheet. Typically the edge is flat, or substantially flat, but the edge may be curved. For example the edge may be convex or concave.

Preferably the first edge of the second sheet of glass has an edge strength greater than 50 MPa.

Preferably the first edge of the second sheet of glass is a mechanically cut edge.

A mechanically cut edge of a sheet of glass is an edge produced as follows. First physical contact is made between a scoring means and at least one (a first) major surface of the sheet of glass. Next the sheet of glass is moved relative to scoring means to produce a score line on the first major surface of the sheet of glass. Next a force is applied across the score line i.e. a bending moment, to "snap" the sheet of glass along the score line. As a result of this snapping step, the sheet of glass is separated along the score line into two pieces, each piece of glass having a mechanically cut edge along the line of separation. In the art this method of separating brittle material such as glass into two pieces is well known.

It has been found that a mechanically cut edge may provide a glass sheet with sufficient resistance to thermal breakage, however due to the random nature of the edge strength of a glass sheet, it may be necessary to subject the glass sheet with at least one mechanically cut edge to a pre-determined selection criteria such that upon passing the pre-determined selection criteria, the glass sheet with the first edge being a mechanically cut edge is used as at least the first or second sheet of glass in the first glazing panel of the switchable glazing unit. The pre-determined selection criteria may include an edge strength measurement.

Preferably the first edge of the second sheet of glass is a laser cut edge. The first edge of the second sheet of glazing material may initially be a mechanically cut edge, but then subsequently converted to a laser cut edge by a subsequent laser cutting operation.

Suitable lasers for producing a laser cut edge of a sheet of glass include a $CO_2$ laser, a CO laser and a Nd:YAG laser.

In some laser cutting operations a scribe line is initially made on a major surface of the glass sheet to be cut. This scribe line is then used to propagate a crack produced by a laser heating the glass and rapid cooling thereof. In contrast a mechanical cut edge does not use a laser.

Preferably the first edge of the second sheet of glass is a polished edge. A polished edge is an edge that has been abraded using finer grade abrasive material to polish the edge. A polished edge has less surface flaws compared to a mechanically cut edge from which cracks may propagate due to thermal stress. It will therefore be readily appreciated that the first edge of the second sheet of glass may initially be mechanically cut, but then subsequently converted to a polished edge by polishing with suitable abrasive material.

Preferably the first edge of the second sheet of glass is a fire polished edge. A fire polished edge may be formed during the glass making process, or by subsequent treatment of the edge with a flame. It will therefore be readily appreciated that the first edge of the second sheet of glass may initially be mechanically cut, but then subsequently converted to a fire polished edge by the application of sufficient heat. It is preferred to carry out such a subsequent fire-polishing step prior to making the liquid crystal cell or the glazing panel.

Preferably the first edge of the second sheet of glass has an edge strength greater than 60 MPa or 70 MPa or 80 MPa or 90 MPa or 100 MPa.

Preferably the first edge of the second sheet of glass has an edge strength between 100 MPa and 300 MPa.

It is desirable to have the edge strength of the first edge of the second sheet of glass as high as possible, although in practice the edge strength of the first edge of the second sheet of glass has a lower level $E2_{min}$ and an upper level $E2_{max}$. Preferably $E2_{max}-E2_{min}$ for the first edge of the second sheet of glass is between $x_1$ MPa and $x_2$ MPa where $x_1$ is 50 MPa or 60 MPa or 70 MPa or 80 MPa or 90 MPa or 100 MPa and $x_2$ is 150 MPa or 200 MPa or 250 MPa or 300 MPa or 400 MPa or 450 MPa or 500 MPa.

It is advantageous to have $E2_{max}-E2_{min}$ for the first edge of the second sheet of glass as low as possible as this reduces the potential variability of the thermal breakage behaviour of the second sheet of glass.

Preferably the first edge of the first sheet of glass is a mechanically cut edge.

Preferably the first edge of the first sheet of glass is a laser cut edge. The first edge of the first sheet of glass may initially be mechanically cut, but then subsequently converted to a laser edge by a laser cutting operation.

Preferably the first edge of the first sheet of glass is a fire polished edge. The first edge of the first sheet of glass may initially be mechanically cut, but then subsequently converted to a fire polished edge by the application of sufficient heat.

Preferably the first edge of the first sheet of glass is a polished edge. The first edge of the first sheet of glass may initially be mechanically cut, but then subsequently converted to a polished edge by polishing with suitable abrasive material.

Preferably the first edge of the first sheet of glass has an edge strength greater than 60 MPa or 70 MPa or 80 MPa or 90 MPa or 100 MPa. Preferably the first edge of the first sheet of glass has an edge strength between 100 MPa and 300 MPa.

It is desirable to have the edge strength of the first edge of the first sheet of glass as high as possible, although in practice the edge strength of the first edge of the first sheet of glass has a lower level $E1_{min}$ and an upper level $E1_{max}$. Preferably $E1_{max}-E1_{min}$ for the first edge of the first sheet of glass is between $y_1$ MPa and $y_2$ MPa where $y_1$ is 50 MPa or 60 MPa or 70 MPa or 80 MPa or 90 MPa or 100 MPa and $y_2$ is 150 MPa or 200 MPa or 250 MPa or 300 MPa or 400 MPa or 450 MPa or 500 MPa.

It is advantageous to have $E1_{max}-E1_{min}$ for the first edge of the first sheet of glass as low as possible as this reduces the potential variability of the thermal breakage behaviour of the first sheet of glass.

Preferably the first edge of the first sheet of glass has been coated with a sealing material to provide the second sheet of glass with an improved resistance to thermal breakage. Preferably the sealing material comprises an epoxy resin, ceramic material or glass frit.

Preferably the first edge of the second sheet of glass has been coated with a sealing material to provide the second sheet of glass with an improved resistance to thermal breakage. Preferably the sealing material comprises an epoxy resin, ceramic material or glass frit.

Preferably the first and/or second sheet of glass has passed a pre-determined selection criteria prior to and/or after being incorporated in the first glazing panel and/or the switchable glazing unit. Preferably the pre-determined selection criteria includes a measurement of the edge strength of the first edge of the or each respective glass sheet. Preferably the pre-determined selection criteria includes a lower edge strength value $E_L$ for the edge strength of the first edge of the first and/or second glass sheet. Preferably the pre-determined selection criteria includes a lower edge strength value $E_L$ and a deviation $E_d$ therefrom for the edge strength of the first edge of the first and/or second glass sheet.

The edge strength of the first edge of the first and/or second sheet of glass may be measured "in-plane" and/or "out-of-plane".

Preferably first opacity is greater than the second opacity such that with no voltage applied between the first and second electrodes the transmission of visible light through the glazing panel is lowest.

Preferably the first and/or second sheet of glass is a ply in a laminate comprising the first sheet of glass or second sheet of glass respectively and a plastic ply optionally joined to a further sheet of glazing material such as a glass sheet. That is, it is preferred that the first and/or second sheet of glass is a ply in a respective laminate.

Preferably the first pane of glazing material is glass, more preferably annealed glass, semi-toughened glass or toughened glass. A preferred glass composition is a soda-lime-silicate composition.

Preferably the first pane of glazing material comprises at least one plastic ply such as polycarbonate.

Preferably the first pane of glazing material has a coating on at least a portion of one or both major surfaces thereof, in particular a low emissivity coating. For the avoidance of doubt, the first pane of glazing material has a first major surface and an opposing second major surface Preferably the switchable glazing unit comprises a second pane of glazing material spaced apart from the first and/or second sheet of glass of the first glazing panel and/or the first pane of glazing material by at least one perimeter seal. The second pane of glazing material may be a sheet of glass with or without a coating on one or both major surfaces thereof.

Preferably the switchable glazing unit comprises a plurality of panes of glazing material spaced apart from the first pane of glazing material.

Preferably the first and/or second sheet of glass and/or first pane of glazing material is annealed glass, preferably annealed soda-lime-silicate glass.

A typical soda-lime-silicate glass composition is (by weight), $SiO_2$ 69-74%; $Al_2O_3$ 0-3%; $Na_2O$ 10-16%; $K_2O$ 0-5%; $MgO$ 0-6%; $CaO$ 5-14%; $SO_3$ 0-2%; $Fe_2O_3$ 0.005-2%.

Preferably the first sheet of glass has a thickness between 0.5 mm and 10 mm.

Preferably the second sheet of glass has a thickness between 0.5 mm and 10 mm.

Preferably the first sheet of glass has a second edge opposite the first edge of the first sheet of glass. Preferably the second edge of the first sheet of glass has the same properties as the first edge of the first sheet of glass. The second edge of the first sheet of glass may be a laser cut edge, a fire polished edge or a polished edge, or a mechanically cut edge. Preferably the second edge of the first sheet of glass has been coated with a sealing material. Preferably the second edge of the first sheet of glass has an edge strength greater than 50 MPa, or greater than 60 MPa or greater than 70 MPa or greater than 80 MPa or greater than 90 MPa or greater than 100 MPa.

Preferably the second sheet of glass has a second edge opposite the first edge of the second sheet of glass. Preferably the second edge of the second sheet of glass has the same properties as the first edge of the second sheet of glass. The second edge of the second sheet of glass may be a laser cut edge, a fire polished edge or a polished edge, or a mechanically cut edge. Preferably the second edge of the second sheet of glass has been coated with a sealing material Preferably the second edge of the second sheet of glass has an edge strength greater than 50 MPa, or greater than 60 MPa or greater than 70 MPa or greater than 80 MPa or greater than 90 MPa or greater than 100 MPa.

In some embodiments the first sheet of glass has three or more edges defining at least a portion of the periphery of the first sheet of glass.

Preferably each of the three or more edges of the first sheet of glass is produced using the same process.

Preferably at least one of the three or more edges of the first sheet of glass is a laser cut edge or a fire polished edge or a polished edge, or a mechanically cut edge, or is an edge coated with a sealing material.

Preferably each of the three of more edges of the first sheet of glass has an edge strength greater than 50 MPa, or greater than 60 MPa or greater than 70 MPa or greater than 80 MPa or greater than 90 MPa or greater than 100 MPa.

Preferably each of the three or more edges of the first sheet of glass is a laser cut edge or a mechanically cut edge or a fire polished edge or a polished edge. Preferably each of the three or more edges of the first sheet of glass has been coated with a sealing material.

In some embodiments the second sheet of glass has three or more edges defining at least a portion of the periphery of the second sheet of glass.

Preferably each of the three or more edges of the second sheet of glass is produced using the same process.

Preferably at least one of the three or more edges of the second sheet of glass is a laser cut edge or a fire polished edge or a polished edge, or a mechanically cut edge, or is an edge coated with a sealing material.

Preferably each of the three of more edges of the second sheet of glass has an edge strength greater than 50 MPa, or greater than 60 MPa or greater than 70 MPa or greater than 80 MPa or greater than 90 MPa or greater than 100 MPa.

Preferably each of the three or more edges of the second sheet of glass is a laser cut edge or a mechanically cut edge or a fire polished edge or a polished edge. Preferably each of the three or more edges of the first sheet of glass has been coated with a sealing material.

In some embodiments, the first and/or second sheet of glass may initially have mechanically cut edges, but such edges can be removed by a subsequent trimming process, either before or after the first glazing panel has been assembled.

When the trimming process is a laser cutting process in some embodiments the first and second sheets of glass have laser cut edges prior to assembly of the glazing panel.

In some embodiments a laser trimming process is used after the first and/or second sheets of glass have been assembled thereby allowing any handling defects introduced during assembly or subsequent handling to be removed before the glazing panel is installed as a window in a building.

In some embodiments the first glazing panel is produced by cutting one or more glazing panels from a mother sheet. The mother sheet comprises two spaced apart sheets of glass and at least one (a first) region therebetween bounded by a barrier, there being in the first region a layer of liquid crystal material. Each region bounded by a barrier may be cut from the mother sheet to provide a glazing panel.

In some embodiments when the first glazing panel is produced by cutting one or more glazing panels from a mother sheet, the barriers are continuous without any gaps in the periphery. A volume of liquid crystal material is dispensed into each bounded region and the second sheet of glass is placed on top of the barriers. The barriers are then cured to join the first sheet of glass to the second sheet of glass to create a mother sheet comprising one or more bounded regions containing a layer of liquid crystal material. Each bounded region is then cut from the mother sheet to produce a glazing panel that may be used in a switchable glazing unit in accordance with the present invention.

It may be desirable to produce a mother sheet comprising at least one bounded region that does not contain a liquid crystal material. The liquid crystal material may then be introduced into each bounded region by a secondary process. This can be achieved by providing a barrier with a gap in the periphery thereof through which the liquid crystal material may be introduced into the bounded region.

When the mother sheet comprises two or more bounded regions, preferably each bounded region contains the same type of liquid crystal material. Alternatively, one bounded region may contain a first liquid crystal material and another bounded region may contain a second liquid crystal material.

In some embodiments when a mother sheet is used, the optical transmission of light through two of the regions of the mother sheet is different.

In some embodiments when a mother sheet is used, the barrier has one or more gap in the periphery thereof, and the second sheet of glazing material is positioned on the first sheet of glazing material before the liquid crystal material is positioned in the bounded region. A volume of liquid crystal material is then positioned in the bounded region through the gap in the barrier around the bounded region.

Other embodiments have other preferable features.

Preferably the edge strength of the first edge of the first and/or second sheet of glass has a respective lower level $E_{min}$ and a respective upper level $E_{max}$ and wherein $E_{max} - E_{min}$ for the first edge of the first and/or second sheet of glass is between $z_1$ MPa and $z_2$ MPa, where $z_1$ is 50 MPa or 60 MPa or 70 MPa or 80 MPa or 90 MPa or 100 MPa and $z_2$ is 150 MPa or 200 MPa or 250 MPa or 300 MPa or 400 MPa or 450 MPa or 500 MPa.

Preferably the first major surface of the first and/or second sheet of glass has an area greater than 0.1 m², more preferably greater than 0.5 m², even more preferably greater than 1 m², even more preferably greater than 2 m².

Preferably the first major surface of the first and/or second sheet of glass has an area between 0.1 m² and 10 m², more preferably between 1 m² and 10 m². Preferably the first major surface of the first and/or second sheet of glass has an area between 0.1 m² and 8 m², more preferably between 1 m² and 8 m².

Preferably the first glazing panel comprises a low emissivity coating on one or more exposed major surface thereof.

Preferably the switchable glazing unit comprises a second glazing panel spaced apart from the first glazing panel by a perimeter seal. The second glazing panel may have the same construction as the first glazing panel. Suitably the second glazing panel comprises a first sheet of glass sheet of the second glazing panel, a second sheet of glass of the second glazing panel and a layer of liquid crystal material of the second glazing panel, the first sheet of glass of the second glazing panel having a first major surface, a second opposing major surface and at least one (a first) edge between the first and second major surfaces of the first sheet of glass of the second glazing panel; the second sheet of glass of the second glazing panel having a first major surface, a second opposing major surface and at least one (a first) edge between the first and second major surfaces of the second sheet of glass of the second glazing panel; there being a first electrode layer on at least a portion of the first major surface of the first sheet of glass of the second glazing panel and a second electrode layer on at least a portion of the first major surface of the second sheet of glass of the second glazing panel, wherein the layer of liquid crystal material of the second glazing panel is between the first electrode layer of the second glazing panel and the second electrode layer of the second glazing panel, the first and second electrode layers of the second glazing panel being connectable with a power supply, further wherein when no voltage is applied to the first and second electrode layers of the second glazing panel, the liquid crystal layer of the second glazing panel has a first opacity, and upon applying a suitable voltage between the first and second electrode layers of the second glazing panel, the liquid crystal layer of the second glazing panel has a second opacity different to the first opacity.

Preferably the second glazing panel comprises the first pane of glazing material.

Preferably the second glazing panel is a switchable glazing panel.

Preferably the second glazing panel comprises a low emissivity coating on one or more exposed major surface thereof.

In embodiments having first and second glazing panels, it is preferred that the switchable glazing unit has only two panes, a first pane comprising the first glazing panel and a second pane comprising the second glazing panel.

In some embodiments the switchable glazing unit comprises a framing system such that the first glazing panel and/or the first pane of glazing material are surrounded by the framing system. When the switchable glazing unit comprises additional sheets of glazing material and/or additional glazing panels, preferably the framing system surrounds the additional sheets of glazing material and/or the additional glazing panels.

When the switchable glazing unit comprises a framing system, suitably a portion of the framing system covers a region of one or both major surfaces of the switchable glazing unit such that visible light is prevented from passing through the switchable glazing unit in the region covered by the portion of the framing system. When the framing system covers a region of one or both major surfaces of the switchable glazing unit, the problem of thermal stress being developed is further increased because the glass sheets of the first glazing panel and/or the first sheet of glazing material absorb heat differently to the region of the switchable glazing unit covered by the portion of the framing system. The result is that the edges of the glass sheets in the first glazing panel and/or the first sheet of glazing material are cooler than the central regions thereof. This problem may be reduced by using a framing system that is dark in colour to provide good absorption of solar radiation.

Preferably the switchable glazing unit comprises a first electrical connector, preferably a first busbar, in electrical communication with the first electrode layer of the first glazing panel.

Preferably the switchable glazing unit comprises a second electrical connector, preferably a second busbar, in electrical communication with the second electrode layer of the first glazing panel.

Preferably the first and/or second electrode layer of the first glazing panel comprises at least one layer of tin oxide, preferably fluorine doped tin oxide.

Preferably the first major surface of the first sheet of glass faces the first major surface of the second sheet of glass.

Preferably the layer of liquid crystal material of the first glazing panel is at least 5 μm thick and/or less than 100 μm thick.

Preferably the layer of liquid crystal material of the first glazing panel is between 5 µm and 50 µm thick, more preferably between 5 µm and 35 µm thick.

Preferably the first sheet of glass of the first glazing panel is joined to the second sheet of glass of the first glazing panel by at least one (a first) barrier, the first barrier defining a periphery of a cell volume in which the layer of liquid crystal material of the first glazing panel is contained.

The first barrier keeps the first sheet of glass of the first glazing panel spaced apart from the second sheet of glass of the first glazing panel and provides a space for a liquid crystal material and consequently a thickness of the liquid crystal layer of the first glazing panel.

Preferably the first barrier is less than 100 µm thick, more preferably the first barrier is between 5 µm and 50 µm thick, even more preferably the first barrier is between 5 µm and 35 µm thick.

Preferably the first barrier comprises one or more spacers to help keep the first sheet of glass spaced apart from the second sheet of glass.

Preferably there are one or more spacers in the cell volume of the first glazing panel to help maintain the spacing of the first and second sheets of glass of the first glazing panel. The spacers may provide a thermal path between the first and second sheets of glass such that the thermal absorption of the first and/or second sheet of glass of the first glazing panel may be influenced by thermal conduction at least in part by the one or more spacers.

Preferably the layer of liquid crystal material of the first glazing panel comprises at least one (a first) dye, more preferably at least one (a first) dichroic dye. Preferably the first dye and/or first dichroic dye of the layer of liquid crystal material of the first glazing panel absorb electromagnetic radiation in the visible region. In embodiments when the switchable glazing unit comprises a second glazing panel having a layer a liquid crystal material, preferably the layer of liquid crystal material of the second glazing panel comprises at least one (a first) dye, more preferably at least one (a first) dichroic dye. Preferably the first dye and/or first dichroic dye absorb of the liquid crystal material of the second glazing panel electromagnetic radiation in the visible region.

The switchable glazing unit has a first major surface and an opposing second major surface and the switchable glazing unit is configured such that when the switchable glazing unit is installed in a building, the first major surface of the switchable glazing unit faces towards the exterior of the building, and the second major surface of the switchable glazing unit faces the interior of the building.

Preferably the switchable glazing unit is installed in a building such that the optical path of sunlight through the switchable glazing unit passes through the first glazing panel before passing through the first pane of glazing material.

Preferably when the switchable glazing unit is installed in a building, the first glazing panel is the outermost pane of the switchable glazing unit. This configuration has the advantage of providing a lower G-value, but has a greater risk of thermal stress being developed therein.

Alternatively the switchable glazing unit is installed in a building such that the optical path of sunlight through the switchable glazing unit passes through the first pane of glazing material before passing through the first glazing panel.

Preferably the first glazing panel is the innermost pane of the switchable glazing unit. This configuration has the advantage of providing a lower risk of thermal stress being developed, but the switchable glazing unit does not have lowest G-value because switchable glazing unit is able to re-radiate heat back into the building via the first glazing panel and this is often not desirable in a building.

It will be readily apparent that a switchable glazing unit according to some embodiments of the present invention comprises a cell for containing a liquid crystal material, the cell comprising a first sheet of glass having a first major surface, a second opposing major surface and at least one (a first) edge between the first and second major surfaces of the first sheet of glass; a second sheet of glass having a first major surface, a second opposing major surface and at least one (a first) edge between the first and second major surfaces of the second sheet of glass; a first electrode layer on at least a portion of the first major surface of the first sheet of glass; a second electrode layer on at least a portion of the first major surface of the second sheet of glass; and a barrier between the first electrode layer and the second electrode layer, wherein the first edge of the first sheet of glass has an edge strength greater than 50 MPa and/or has been coated with a sealing material.

Such a cell is suitable for making a glazing panel, the glazing panel being used in combination with a pane of glazing material to make a switchable glazing unit in accordance with the present invention. By having the first edge of the first sheet of glass to have an edge strength greater than 50 MPa and/or to have been coated with a sealing material improves the resistance to thermal breakage of the glazing panel when a layer of liquid crystal material is positioned in the cell.

Preferably the first electrode layer of the cell faces the second electrode layer of the cell.

Preferably the barrier contacts the first and/or second electrode layer of the cell.

Preferably the first edge of the second sheet of glass has an edge strength greater than 50 MPa and/or has been coated with a sealing material to improve the resistance to thermal breakage of the glazing panel when a layer of liquid crystal material is positioned in the cell.

The present invention also provides a method of making a switchable glazing unit comprising at least one glazing panel, the method comprising the steps: (i) providing a first sheet of glass having a first major surface and a second opposing major surface; (ii) depositing at least one (a first) barrier on the first major surface of the first sheet of glass to delimit at least one (a first) portion of the first major surface of the first sheet of glass; (iii) positioning a layer of liquid crystal material on the first portion of the first major surface; (iv) providing a second sheet of glass on the first barrier such that the second sheet of glass faces the first sheet of glass; (v) curing the first barrier such that the first sheet of glass is joined to the second sheet of glass by at least the first barrier to form a mother sheet; (vi) removing the first portion bounded by the first barrier from the mother sheet by a cutting process to provide a first glazing panel comprising a first sheet of glass having at least one edge and a second sheet of glass having at least one edge, (vii) joining the first glazing panel to a first sheet of glazing material with a perimeter seal.

Preferably the first and/or second sheet of glass of the first glazing panel has at least one edge having an edge strength greater than 50 MPa.

Preferably the first and/or second sheet of glass of the first glazing panel has at least one edge that has been coated with a sealing material.

Preferably the first and/or second sheet of glass of the first glazing panel has at least one edge having an edge strength greater than 60 MPa or greater than 70 MPa or greater than 80 MPa or greater than 90 MPa or greater than 100 MPa.

Preferably the at least one edge of the first and/or second sheet of glass is a mechanically cut edge or a laser cut edge or a fire polished edge or a polished edge.

Preferably step (iv) takes place before step (iii), and during step (ii) a gap is left in the first barrier such that in step (iii) the volume of liquid crystal is positioned on the portion of the first major surface through the gap in the first barrier.

Preferably the at least one edge of the first and/or second sheet of glass of the first glazing panel is a mechanically cut edge or a laser cut edge or a fire polished edge or a polished edge following step (v) or step (vi) or step (vii).

Preferably at step (vi) the cutting process is a laser cutting process or a mechanical cutting process.

Preferably following step (vi) the first and/or second sheet of glass of the first glazing panel has all mechanically cut edges, and one or more edge of the first and/or second sheet of glass of the first glazing panel is produced by a subsequent trimming step.

Preferably more than one glazing panel is cut from the mother sheet.

The present also provides another method of making a switchable glazing unit comprising at least one glazing panel, the method comprising the steps: (i) providing a first sheet of glass having a first major surface and a second opposing major surface; (ii) depositing at least one (a first) barrier on the first major surface of the first glass sheet to delimit at least one (a first) portion of the first major surface of the first glass sheet; (iii) positioning a layer of liquid crystal material on the first portion of the first major surface of the first glass sheet; (iv) providing a second sheet of glass on the first barrier such that the second sheet of glass faces the first sheet of glass; (v) curing the barrier such that the first sheet of glass is joined to the second sheet of glass by at least the first barrier to form the first glazing panel; (vi) joining the first glazing panel to a first sheet of glazing material with a perimeter seal.

Each of the first and second sheets of glass has a first major surface, a second opposing major surface and at least one edge therebetween.

Preferably the first and/or second sheet of glass has at least one edge having an edge strength greater than 50 MPa.

Preferably the first and/or second sheet of glass has at least one edge that has been coated with a sealing material.

Preferably the first and/or second sheet of glass has at least one edge having an edge strength greater than 60 MPa or greater than 70 MPa or greater than 80 MPa or greater than 90 MPa or greater than 100 MPa.

Preferably the at least one edge of the first and/or second sheet of glass is a mechanically cut edge or a laser cut edge or a fire polished edge or a polished edge.

BRIEF DESCRIPTION OF THE DRAWINGS

The invention will now be described with reference to the following figures (not to scale) in which, FIG. 1 shows a schematic cross-sectional view of a glazing panel for use in a switchable glazing unit in accordance with the present invention;

FIG. 2 shows a schematic cross-sectional view of another glazing panel for use in a switchable glazing unit in accordance with the present invention;

FIG. 3 shows a schematic isometric representation of the glazing panel shown in FIG. 1;

DETAILED DESCRIPTION OF THE INVENTION

Figure 4:
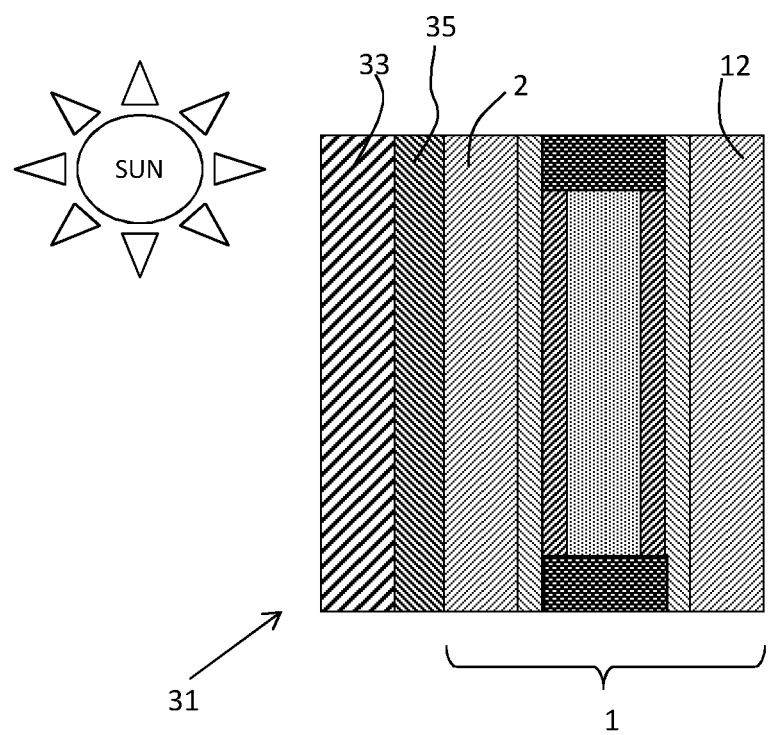
FIG. 4 shows a schematic cross-sectional view of another glazing panel for using in a switchable glazing unit according to the present invention.

FIG. 1 shows a glazing panel 1 for use in a switchable glazing unit according to the present invention. The glazing panel 1 comprises a first sheet 2 of annealed soda-lime-silicate glass. A transparent electrically conductive coating 4 is on one of the major surfaces of the glass sheet 2. For clarity the transparent electrically conductive coating 4 is on the first major surface of the first glass sheet 2. The first glass sheet 2 has a second major surface opposite the first major surface. The transparent electrically conductive coating 4 may comprise ITO, or one or more layers of tin oxide, which may or may not be doped with fluorine. On the transparent electrically conductive coating 4 is an alignment layer 6 of polyimide or other similar material. As is known in the art, for certain liquid crystal materials an alignment layer 6 may be used to align the liquid crystal molecules relative to the surface of the sheet in the "zero applied voltage" state.

A barrier 8 is on the glass sheet 2 and extends around the periphery thereof and is in contact with the transparent electrically conductive coating 4. In the example shown, the barrier 8 is about 30 μm thick i.e. the barrier extends about 30 μm from the transparent electrically conductive coating 4.

The glazing panel 1 also comprises a second sheet 12 of annealed soda-lime-silicate glass having a transparent electrically conductive coating 14 on a major surface thereof. For clarity transparent electrically conductive coating 14 is on the first major surface of the second sheet of glass 12. The second glass sheet 12 has a second major surface opposite the first major surface thereof. The glazing panel 1 is arranged such that the transparent electrically conductive coating 4 faces the transparent electrically conductive coating 14.

A second alignment layer 16 is on the coating 14. The alignment layer 16 has been rubbed such that in the glazing panel 1 the direction of rubbing of the alignment layer 16 is perpendicular to the direction of rubbing of the alignment layer 6.

The second glass sheet 12 is joined to the first glass sheet 2 by the barrier 8 such that the first and second glass sheets 2, 12 are spaced apart in parallel relation by about 30 μm i.e. the thickness of the barrier 8. The barrier 8 is in contact with the electrically conductive coating 14.

Each transparent electrically conductive coating 4, 14 is an electrode layer.

Although not shown in FIG. 1, the glazing panel 1 has a suitable first electrical connector in electrical communication with the transparent electrically conductive coating 4 and a suitable second electrical connector in electrical communication with the transparent electrically conductive coating 14.

As is known from WO98/05998A1, the two coated glass sheets may be arranged in a slightly staggered fashion so that opposed ends of the coated surfaces protrude slightly so that it easier to make electrical connection to the electrode layers 4,14. For example conductive tracks of adhesive copper tape may be applied to provide electrical connections to the transparent electrically conductive coatings 4, 14. This is further described in relation to FIG. 2.

As shown in FIG. 1, the barrier 8 is in contact on one side with the transparent electrically conductive coating 4 on the first major surface of the first glass sheet 2 and on the other side with the transparent electrically conductive coating 14 on the first major surface of the second glass sheet 12. In alternative embodiments a region of the first major surface of the first glass sheet 2 and/or the first major surface of the second glass sheet 12 may be free from transparent electrically conductive coating and the barrier positioned on the coating free region of the respective glass sheet. The coating free region of the first major surface of the first glass sheet 2 and/or the first major surface of the second glass sheet 12 may be due to a mask being used during the coating process and/or selective removal of the transparent electrically conductive coating.

Inside the cavity defined by the barrier 8 and the inner facing surfaces of the coated glass sheets 2, 12 is a layer of liquid crystal material 18. The liquid crystal material 18 comprises at least one dichroic dye such that the glazing panel 1 is essentially a guest-host liquid crystal cell.

Suitable liquid crystal/dichroic dye mixtures are described in *Mol. Cryst. Liq. Cryst.* 1979, Vol. 54, p. 161-174.

In this particular example, when no voltage is applied between the first transparent electrically conductive coating 4 and the second transparent electrically conductive coating 14, the glazing panel is in a darkened state i.e. the opacity is high. Upon application of a suitable voltage between the first transparent electrically conductive coating 4 and the second transparent electrically conductive coating 14, the orientation of the liquid crystal molecules changes, thereby changing the orientation of the dichroic dye molecules. The glazing panel 1 becomes more transparent to visible light due to the lower optical absorption of the dye molecules in the orientation and the opacity of the glazing panel 1 decreases.

Also in the cavity containing the liquid crystal layer 18 are a plurality of suitable spacers (not shown) to ensure the spacing between the first and second glass sheets is maintained throughout the switchable area i.e. in the direction of arrow 28 and being the area inboard of the barrier 8.

The thickness of glass produced by a float process typically has periodic variations which may be over a distance of 10-20 cm and also over a distance of 1-5 cm, sometimes referred to in the art as "warp" and "microcorrugation" respectively. Warp may be more pronounced for thermally toughened glass. Whilst it may be possible under the application of pressure to reduce the flatness variations due to warp, it may not be possible to reduce the flatness variations due to microcorrugation in a similar manner. If the spacers are of a sufficient size such that the thickness variations of the glass sheet are small compared to the desired cell gap, the effect of the thickness variations, especially from microcorrugation, may be less important.

In order to provide a glazing panel 1 with a switchable area that switches uniformly, it has been found useful to use sheets of annealed glass. Such sheets may be suitably cut from larger sheets as required.

However, by using annealed glass sheets, the potential for thermal breakage is greater than when using an equivalent glass sheet that has been thermally toughened.

In applications where glass may be subject to thermal stress, much is known in the industry, see for example "JRC SCIENTIFIC AND POLICY REPORTS—Guidance for European Structural Design of Glass Components, ISBN (pdf) 978-92-35093 (2014)" and "Draft for prEN (no number): Glass in building—Thermal stress calculation method (CEN/TC129/WG8—N241E), July 2007".

In "Draft for prEN (no number): Glass in building—Thermal stress calculation method (CEN/TC129/WG8—N199E), November 2004" Table 1 provides guidance on the allowable temperature difference for a pane to be thermally safe. In this table float or sheet glass less than or equal to 12 mm thick is said to have an allowable temperature difference of 35° C., whereas heat strengthened glass (all types) and toughened glass (all types) is said to have an allowable temperature difference of 100° C. and 200° C. respectively. Laminated glass in this table is said to have an allowable temperature difference equal to the smallest value of the component panes.

In the field of glass in building, thermally toughened soda-lime-silicate safety glass is defined in BS EN 12150-1 (2000). Section 3.1 of this standard defines thermally toughened soda lime silicate safety glass as "glass within which a permanent surface compressive stress has been induced by a controlled heating and cooling process in order to give it greatly increased resistance to mechanical and thermal stress and prescribed fragmentation characteristics.

Glass may be semi-toughened or heat strengthened. Such glass for use in building is defined according to BS EN 1863-1 (2000). Heat strengthened glass is not toughened glass as defined in BS EN 12510-1 (2000) but has undergone some form of heat treatment.

Soda lime silicate glass for use in building may also be termed "heat soaked thermally toughened soda lime silicate glass" and is defined in accordance with EN 14179-1 (2005). In section 3.1 of this standard, heat soaked thermally toughened soda lime silicate safety glass is defined as glass within which a permanent surface compressive stress has been induced in order to give it greatly increased resistance to mechanical and thermal stress and prescribed fragmentation characteristics and which has a known level of residual risk of spontaneous breakage due to the presence of critical nickel sulphide (NiS) inclusions.

In accordance with an embodiment of the present invention, the edges 20, 22 of the first sheet of glass 2 have an edge strength greater than 50 MPa and in this embodiment have been produced by laser cutting.

In this example, the first sheet of annealed glass 2 has been cut from a larger sheet of annealed glass having a transparent electrically conductive coating thereon. In plan view the first sheet 2 has major surfaces with rectangular outline and each edge connecting the opposing major surfaces is a laser cut edge.

It is possible to laser cut the first glass sheet 2 from a larger sheet of annealed glass and to then deposit the transparent electrically conductive coating thereon, but this increases costs and cycle time. It is also possible to laser cut to the desired size a glass sheet that has already been coated.

It is also possible to mechanically cut the glass sheet 2 from a larger glass sheet, and to then trim the mechanically cut edges with a laser, thereby producing a laser cut edge having the required edge strength.

Alternatively it is possible to fire polish the mechanically cut edge with a localised heat such as an oxyacetylene torch.

Alternatively the mechanically cut edges can be polished with suitable abrasives. Alternatively, or in addition to, the glass sheet having the mechanically cut edges can be tested to measure the edge strength thereof. If the edge strength of the mechanically cut edge is greater than 50 MPa, such a glass sheet may be used in the construction of the glazing panel 1.

It will be evident that if a glazing panel as shown in FIG. 1 is assembled with glass sheets having mechanically cut edges, the mechanically cut edges may be removed by trimming the glass sheet with a laser to produce a laser cut edge, or by localised application of a heat source to produce a fire polished edge, which may increase edge strength.

By having an edge strength of greater than 50 MPa for the first and/or second sheets 2 i.e. by laser cutting the edges of the annealed glass sheets, it has been found that the edge strength can be increased to such an extent that the potential risk of thermal breakage may be reduced. For example, by laser cutting the edge strength of the annealed soda-lime-silicate glass sheet may be increased by about five times. The annealed glass sheet 2 with laser cut edges may have a greater resistance to thermal breakage compared to an equivalent glass sheet 2 with mechanically cut edges.

It is advantageous for both glass sheets 2, 12 to have laser cut edges. That is, the edges 24, 26 of the second glass sheet 12 are laser cut edges.

Although the glass sheets are shown as having a rectangular or square shaped periphery, the glass sheets may have other outlines, for example triangular or circular, or with more than four edges, preferably in matched pairs.

The glass sheets 2, 12 in the above example have a thickness of 4 mm, although the thickness of the glass sheets may be less than 1 mm, for example 0.5 mm or 0.7 mm. The thickness of the glass sheets may be in the range 0.5 mm to 12 mm, preferably 0.5 mm to 10 mm, more preferably 0.5 mm to 6 mm.

It is preferred that the glass sheets 2, 12 comprise low levels of additives that may absorb solar radiation, for example ferrous iron. By using glass sheets with low absorption of solar radiation, which includes radiation in the visible and infrared regions of the electromagnetic spectrum, this provides the glass sheets with higher transmission to solar radiation such that in the low opacity state the switchable glazing unit has high visible light transmission. As is conventional in the art, the visible light transmission of the glass sheets may be measured using a standard Illuminant, such as Illuminant C 10° observer angle.

In an alternative construction, the glass sheets 2, 12 are sheets of annealed soda-lime-silicate glass having fire polished edges. Fire polished edges may be produced by the glass manufacturing process, where typically opposite lateral edges of the as-produced glass may have fire polished edges. In this case it may be necessary to laser cut only the non-fire polished edges, or to subsequently fire polish the non-fire polished edges.

In another alternative construction, the glass sheets are sheets of annealed glass having ground edges. A ground edges may be produced by using an abrasive material to grind away a portion of the glass at the edge, thereby producing the ground edge.

In another alternative construction, the glass sheets are annealed glass sheets having polished edges. In one variant a polished edge is similar to a ground edge in that an abrasive material is used to grind away a portion of the glass at the edge, but progressively finer grade abrasives are used to provide a smoother edge.

In another variant a polished edge has been subjected to an acid etching process to remove local surface variations.

In another alternative construction, the edges of the glass sheets are coated with a sealing material such as an epoxy resin, ceramic material or glass frit. The sealing material provides protection to the edges during handling, and also acts to fill in surface cracks that may be present in the mechanically cut edge.

In all of the above alternative constructions the aim is to reduce the propensity of the edge to lead to crack propagation in the glass sheet due to thermal variations in the sheet. In addition, by using a pre-determined selection criteria, glass sheets having an edge strength less than a pre-determined value, for example 50 MPa, thereby having a greater propensity for thermal breakage may be discarded and not used in the production of a switchable glazing unit according to the present invention.

It will be readily apparent that during subsequent handling and/or installation, the edge may become damaged, thereby reducing the edge strength of the glass sheet immediately after having been produced. The edge of the glass sheet, or portions thereof, may be provided with suitable covering means that protects the edge during subsequent handling and/or installation. The covering means may be removed immediately prior installation, or may be left in place when the glazing panel is installed in the switchable glazing unit. For example, a U-shaped member of a compressible material adapted to be press fitted upon an edge of the first and/or second sheet of glass. Such a U-shaped member suitably sized may be used to cover all or any of the edges of the glazing panel 1.

The glazing panel 1 is used as a component part in a switchable glazing unit for a window, in particular in a building or a door. The switchable glazing unit may be incorporated in a suitable frame.

Upon application of a suitable voltage between the first and second transparent electrically conductive coatings 4, 14 i.e. 100V at 50 Hz, the opacity of the liquid crystal layer 18 changes. The voltage may be applied via the first and second electrical connectors in electrical communication with the first and second electrodes 4, 14 respectively.

Reference is made to FIG. 2 to illustrate first and second electrical connectors in electrical communication with the first and second electrodes 4, 14 respectively. FIG. 2 shows a glazing panel 1a where the first glass sheet 2 and second glass sheet 12 are arranged in a staggered fashion for example as described in WO98/05998A1. A first busbar 4a is fixed to and in electrical communication with the transparent electrically conductive coating 4. A second busbar 14a is fixed to and in electrical communication with the transparent electrically conductive coating 14. Conductive adhesives may be used to fix the busbars to the transparent electrically conductive coating. A suitable voltage may be applied between the first and second electrodes 4, 14 via the respective busbars 4a, 14a.

FIG. 3 shows a schematic isometric representation of the glazing panel 1 of FIG. 1. In plan view the glazing panel 1 has a rectangular periphery when viewed in the direction of arrow 28. That is, the first glass sheet 2 has a rectangular periphery. The edge portions of the glass sheets 2, 12 are the minor faces connecting the two major surfaces of the respective sheet.

Edge 22 of glass sheet 2 is shown, as is edge 21. Opposite edge 22 is edge 20 (not shown on this figure). Opposite edge 21 is an edge 23, not labelled or visible in FIG. 3.

Edge 24 of glass sheet 12 is shown, as is edge 25. Opposite edge 24 is edge 26 (not shown on this figure). Opposite edge 25 is an edge 27, not labelled or visible in FIG. 3.

FIG. 4 shows another glazing panel 31 that may be part of a switchable glazing unit in accordance with the present invention. Again the glazing panel 31 may be part of a window for use in a building or door.

The glazing panel 31 comprises the glazing panel 1 shown in FIG. 1 (only the first glass sheet 2 and second glass sheet 12 are labelled for clarity). A third sheet of glass 33 is joined to the first sheet of glass 2 by an interlayer structure 35 consisting of a sheet of polyvinyl butyral (PVB). The interlayer structure may comprise one or more layers of suitable interlayer material, such as ethylene vinyl acetate copolymer (EVA), polyurethane (PU) or PVB. Combinations of interlayer material may be used.

In this example the third glass sheet 33 is a sheet of soda-lime-silicate glass having an iron content of less than 0.05% by weight $Fe_2O_3$. The thickness of the third glass sheet is 8 mm, but may be between 0.5 mm and 20 mm as required.

The third glass sheet 33 may be laminated to the glazing panel 1 by the sheet of PVB using conventional lamination techniques. Alternatively the glazing panel 1 may be constructed with a first sheet of glazing material consisting of the third glass sheet 33 laminated to the first glass sheet 2 via the PVB sheet 35, instead of using the monolithic first glass sheet 2. That is, instead of using a monolithic sheet of glass for the first sheet of glazing material in the glazing panel, a laminated glass sheet is used instead.

Using conventional nomenclature, the surface facing the sun is referred to as surface 1 of the glazing panel 31.

Either glazing panel 1 or 31 may be used as a pane in a switchable glazing unit in accordance with the present invention. Such a switchable glazing unit may be used as a window in a building.

Figure 5:
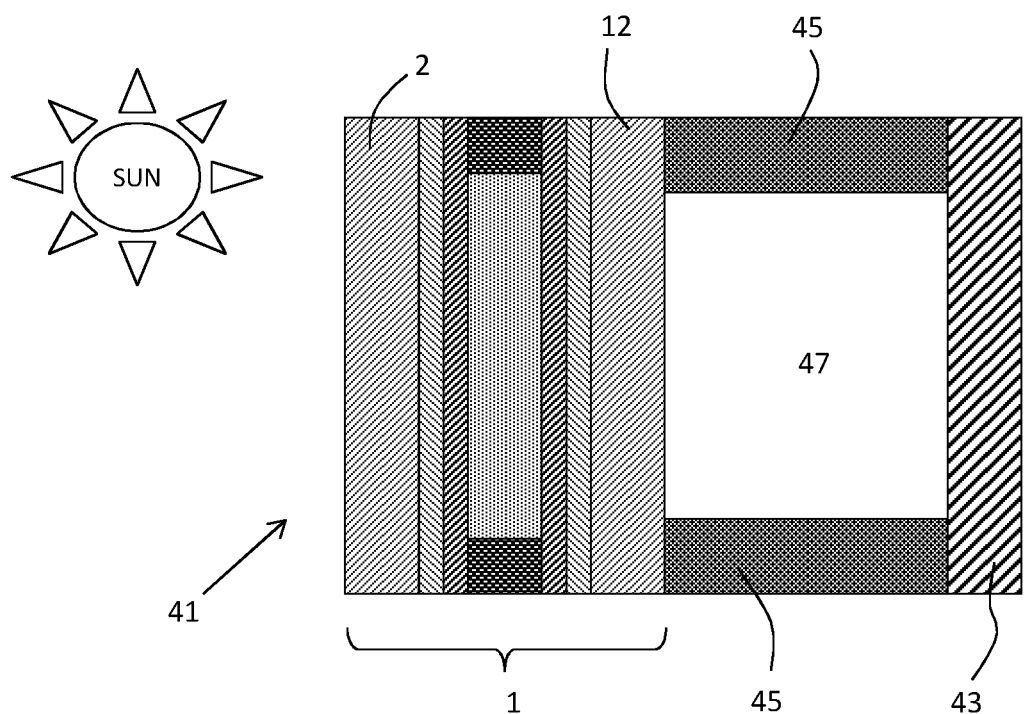
FIG. 5 shows a schematic cross-sectional view of a switchable glazing unit in accordance with the present invention.

FIG. 5 shows a switchable glazing unit 41 according to the present invention incorporating the glazing panel 1 shown in FIG. 1. For clarity only the first and second glass sheets of the glazing panel 1 are labelled. In the art the switchable glazing unit 41 would typically be referred to as a double glazed unit.

The switchable glazing unit 41 comprises a third sheet of glass 43 joined to the second sheet of glass 12 of the glazing panel 1 by a perimeter seal 45. The third sheet of glass 43 has a first major surface facing the second major surface of the second glass sheet 12. The glazing panel 1 is spaced apart from the third sheet of glass 43 by the perimeter seal 45 i.e. there is a space 47 between the third sheet of glass 43 and the glazing panel 1. The perimeter seal 45 defines the periphery of the space 47 between the second sheet of glass 12 and the third sheet of glass 43 such that the window 41 is an insulated glazing unit (i.e. a double glazed unit). The second major surface of the second glass sheet 12 and the first major surface of the third sheet of glass 43 both face the space 47. The perimeter seal 45 may comprise suitable spacer bars (not shown) to maintain the spacing between the second sheet of glass 12 and the third sheet of glass 43. As is evident, the third sheet of glass 43 is a pane of glazing material.

The third sheet of glass 43 may have at least one mechanically cut edges or at least one laser cut edge or at least one fire polished edge or at least one polished edge or at least one ground edge or at least one edge that has been coated with a sealing material.

The edges of the third sheet of glass may be the same type (i.e. produced using the same process or processes) as the edges of the first and/or second sheet of glass 2, 12.

The space 47 may be a low pressure space, or may be an air-space. The space 47 may be filled with an inert gas such as argon.

The third sheet of glass 43 may have a coating on the major surface thereof facing into the space 47. A suitable coating is a low emissivity coating.

In an alternative construction the switchable glazing unit 41 is rotated through 180° such that the third sheet of glass 43 is the outer pane (i.e. faces the sun) and the glazing panel 1 is the inner pane. Such a construction does not have the same risk of thermal breakage as the switchable glazing unit shown in FIG. 5 because the glazing panel is not in direct sunlight. However such a construction is not attractive when the G-value of the switchable glazing unit is an important parameter because the alternative construction just described has a higher G-value than the construction shown in FIG. 5.

Figure 6:
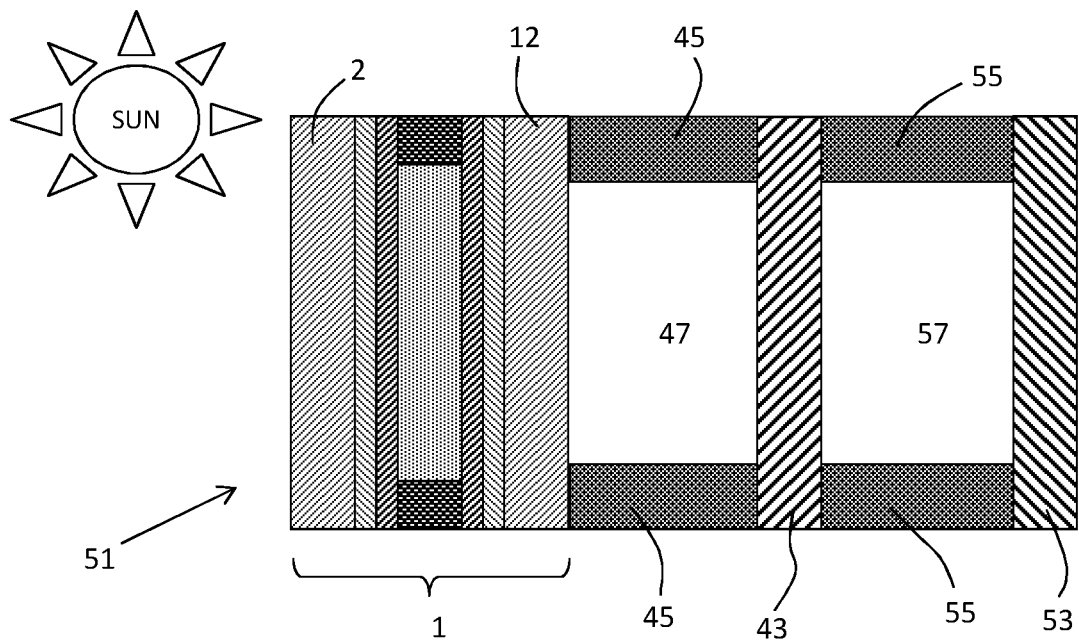
FIG. 6 shows a schematic cross-sectional view of another switchable glazing unit in accordance with the present invention.

FIG. 6 shows another switchable glazing unit 51 incorporating the glazing panel 1 shown in FIG. 1. For clarity only the first and second glass sheets of the glazing panel 1 are labelled. In the art the switchable glazing unit 51 would typically be referred to as a triple glazed unit.

The switchable glazing unit 51 comprises a third sheet of glass 43 joined to the second sheet of glass 12 of the glazing panel 1 by a perimeter seal 45. The glazing panel 1 is spaced apart from the third sheet of glass 43 by the perimeter seal 45 i.e there is a space 47 between the glazing panel 1 and the third sheet of glass 43. The perimeter seal 45 defines the periphery of the space 47 between the second sheet of glass 12 and the third sheet of glass 43.

The switchable glazing unit 51 also comprises a fourth sheet of glass 53 joined to the third sheet of glass 43 by a perimeter seal 55. The perimeter seal 55 defines the periphery of a space 57 between the third sheet of glass 43 and the fourth sheet of glass 53 such that the switchable glazing unit 51 is a triple glazed insulated glazing unit. As is evident, the fourth sheet of glass 53 is a pane of glazing material.

The perimeter seals 45 and 55 may comprise suitable spacer bars to maintain the spacing between the second sheet of glass 12 and the third sheet of glass 43, and the third sheet of glass 45 and fourth sheet of glass 53 respectively.

The space 57 may be a low pressure space, or may be an air-space. The space 57 may be filled with an inert gas such as argon.

Under certain conditions if the third glass sheet 43 and the glazing panel 1 are switched positions such that the glazing panel 1 is the middle pane of the triple glazed insulated glazing unit, such a configuration may give rise to very high thermal stresses in the glazing panel 1. As such, this is not a most preferred construction but is still within the scope of the present invention.

Alternatively the position of the glazing panel 1 and the fourth sheet of glass 53 may be interchanged such that the glazing panel faces the interior of the building in which the switchable glazing unit 51 is installed, and the fourth sheet of glass 53 faces the exterior of the building in which the switchable glazing unit 51 is installed.

Figure 7:
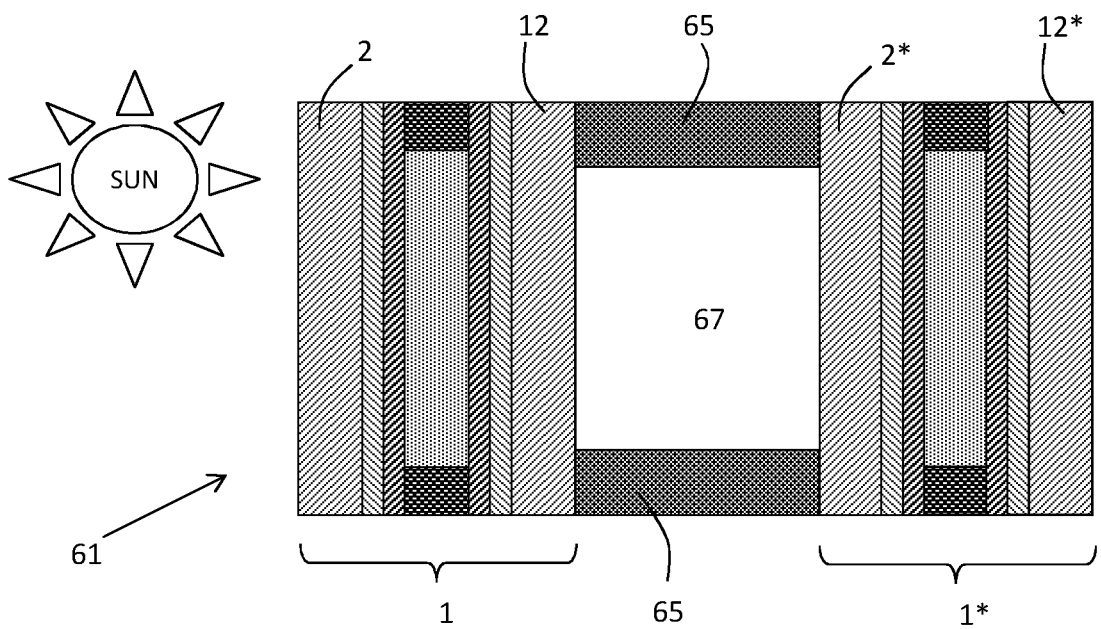
FIG. 7 shows a schematic cross-sectional view of another switchable glazing unit in accordance with the present invention.

FIG. 7 shows another switchable glazing unit 61 comprising two glazing panels (labelled as 1 and 1*) of the type shown in FIG. 1. For clarity only the first and second glass sheets of the glazing panels 1 and 1* are labelled, with components of the glazing panel 1* being labelled in the same way as the components of the glazing panel 1 except with the addition of an asterisk '*' i.e. the first sheet of glass in the glazing panel 1* is labelled as 2* and the second sheet of glass of the glazing panel 1* is labelled as 12*.

In the switchable glazing unit 61 the second sheet of glass 12 of glazing panel 1 is joined to the first sheet of glass 2* of glazing panel 1* by a perimeter seal 65. The glazing panel 1 is spaced apart from the glazing panel 1* by the perimeter seal 65 such that there is a space 67 between the glazing panel 1 and the glazing panel 1*. The perimeter seal 65 defines the periphery of the space 67 between the second glass sheet 12 of the glazing panel 1 and the first pane 2* of the second glazing panel 1*.

Although the examples above refer to sheets of soda-lime-silicate glass, other glass compositions maybe used for any or all of the sheets of glass. For example, borosilicate glass or aluminosilicate glass may be used. One of the glass sheets may have a soda-lime-silicate composition, and another of the glass sheets may have a different composition.

When a glazing panel as shown in FIG. 1 is used as a pane in a switchable glazing unit in accordance with the present invention, for example a double or triple glazing unit, one or more of the other panes thereof may be glass or another type of glazing material, for example plastic i.e. polycarbonate.

Methods to determine the edge strength of glass are known, for example as described in BS EN 1288-1 to 5 (2000). Typically a glass sample, either "lying down" (i.e. out-of-plane) or "edge on" (i.e. in-plane) is subject to a four point bend test setup to determine the force required to break the sample.

Typical sample dimensions for edge strength tests are 25 mm wide and 200 mm long. Lower sample supports are used to support the sample and are spaced 150 mm apart, with each lower support being inboard the nearest edge by 25 mm. Upper (loading) pins 50 mm apart, being inboard the nearest edge by 75 mm are used. The edge strength is determined by applying stress at a rate of 2 MPa/s until failure. Typically at least 30 samples were run. Analysis of the results may be performed using Weibull statistics. If the "in-plane" edge strength was determined, the lower sample supports contact the sample on the edge of interest and the upper pins contact the opposite edge.

If the "out-of-plane" edge strength was determined, the lower sample supports contact a major surface of the sample and the upper pins contact the opposing major surface of the sample. For a mechanical cut, the out-of-plane strength may be used to determine the edge strength when the surface comprising the score line is bent across the lower supports.

Such methods to determine edge strength may form part of a pre-determined selection criteria for evaluating the performance of a glass sheet and/or glazing panel prior to being incorporated into a switchable glazing unit.

The present invention provides particular application in the field of windows for buildings, which may be for interior or exterior architectural applications.

The invention claimed is:

1. A switchable glazing unit comprising at least one (a first) glazing panel and at least one (a first) pane of glazing material, the first glazing panel being spaced apart from the first pane of glazing material by a perimeter seal, wherein the first glazing panel comprises
a first sheet of glass having a thickness in the range of 0.5 mm to 12 mm,
a second sheet of glass having a thickness in the range of 0.5 mm to 12 mm, and
a layer of liquid crystal material,
the first sheet of glass having a first major surface, a second opposing major surface and at least one (a first) edge between the first and second major surfaces of the first sheet of glass;
the second sheet of glass having a first major surface, a second opposing major surface and at least one (a first) edge between the first and second major surfaces of the second sheet of glass;
there being a first electrode layer on at least a portion of the first major surface of the first sheet of glass and a second electrode layer on at least a portion of the first major surface of the second sheet of glass;
wherein the layer of liquid crystal material is between the first electrode layer and the second electrode layer, the first and second electrode layers being connectable to an electrical power supply,
further wherein when no voltage is applied to the first and second electrode layers, the liquid crystal layer has a first opacity, and upon applying a suitable voltage between the first and second electrode layers, the liquid crystal layer has a second opacity different to the first opacity, and
wherein the first edge of the first sheet of glass has an edge strength greater than 50 MPa and/or wherein the first edge of the second sheet of glass has an edge strength greater than 50 MPa.

2. A switchable glazing unit according to claim 1, wherein the first opacity is greater than the second.

3. A switchable glazing unit according to claim 1, wherein the first edge of the first and/or second sheet of glass is a mechanically cut edge or a laser cut edge or a fire polished edge or a polished edge.

4. A switchable glazing unit according to claim 1, wherein the first edge of the first and/or second sheet of glass has an edge strength greater than 60 MPa.

5. A switchable glazing unit according to claim 1, wherein the first edge of the first and/or second sheet of glass has been coated with a sealing material to provide the respective sheet of glass with an improved resistance to thermal breakage.

6. A switchable glazing unit according to claim 1, wherein the first and/or second sheet of glass has passed a pre-determined selection criteria prior to and/or after being incorporated in the first glazing panel and/or the switchable glazing unit.

7. A switchable glazing unit according to claim 1, wherein the first pane of glazing material has a first major surface and an opposing second major surface, further wherein the first and/or second major surface of the first pane of glazing material has a coating on at least a portion thereof, and/or wherein the first glazing panel comprises a low emissivity coating on one or more exposed major surface thereof.

8. A switchable glazing unit according to claim 1, comprising a second glazing panel spaced apart from the first glazing panel by a perimeter seal.

9. A switchable glazing unit according to claim 8, wherein the second glazing panel comprises a first sheet of glass sheet of the second glazing panel, a second sheet of glass of the second glazing panel and a layer of liquid crystal material of the second glazing panel, the first sheet of glass of the second glazing panel having a first major surface, a second opposing major surface and at least one (a first) edge between the first and second major surfaces of the first sheet of glass of the second glazing panel; the second sheet of glass of the second glazing panel having a first major surface, a second opposing major surface and at least one (a first) edge between the first and second major surfaces of the second sheet of glass of the second glazing panel; there being a first electrode layer on at least a portion of the first major surface of the first sheet of glass of the second glazing panel and a second electrode layer on at least a portion of the first major surface of the second sheet of glass of the second glazing panel, wherein the layer of liquid crystal material of the second glazing panel is between the first electrode layer of the second glazing panel and the second electrode layer of the second glazing panel, the first and second electrode layers of the second glazing panel being connectable with a power supply, further wherein when no voltage is applied to the first and second electrode layers of the second glazing panel, the liquid crystal layer of the second glazing panel has a first opacity, and upon applying a suitable voltage between the first and second electrode layers of the second glazing panel, the liquid crystal layer of the second glazing panel has a second opacity different to the first opacity.

10. A switchable glazing unit according to claim 8, wherein the second glazing panel comprises a low emissivity coating on one or more exposed major surface thereof.

11. A switchable glazing unit according to claim 1 further comprising a framing system such that the first glazing panel and/or the first pane of glazing material are surrounded by the framing system, preferably wherein a portion of the framing system covers a region of one or both major surfaces of the switchable glazing unit such that visible light is prevented from passing through the switchable glazing unit in the region covered by the portion of the framing system.

12. A switchable glazing unit according to claim 1, wherein the first and/or second electrode layer of the first glazing panel comprises at least one layer of tin oxide.

13. A switchable glazing unit according to claim 1, wherein the layer of liquid crystal material of the first glazing panel is at least 5 μm thick and/or less than 100 μm thick.

14. A switchable glazing unit according to claim 1, wherein the first sheet of glass of the first glazing panel is joined to the second sheet of glass of the first glazing panel by at least one (a first) barrier, the first barrier defining a periphery of a cell volume in which the layer of liquid crystal material of the first glazing panel is contained.

15. A switchable glazing unit according to claim 1, wherein the layer of liquid crystal material of the first glazing panel comprises at least one dye.

16. A building comprising a switchable glazing unit according to claim 1, wherein the optical path of sunlight through the switchable glazing unit passes through the first glazing panel before passing through the first pane of glazing material or wherein the optical path of sunlight through the switchable glazing unit passes through the first pane of glazing material before passing through the first glazing panel.

17. A cell for containing a liquid crystal material, the cell comprising a first sheet of glass having a thickness in the range of 0.5 mm to 12 mm and having a first major surface, a second opposing major surface and at least one (a first) edge between the first and second major surfaces of the first sheet of glass; a second sheet of glass having a thickness in the range of 0.5 mm to 12 mm and having a first major surface, a second opposing major surface and at least one (a first) edge between the first and second major surfaces of the second sheet of glass; a first electrode layer on at least a portion of the first major surface of the first sheet of glass; a second electrode layer on at least a portion of the first major surface of the second sheet of glass; and a barrier between the first electrode layer and the second electrode layer, wherein the first edge of the first sheet of glass has an edge strength greater than 50 MPa.

18. A cell according to claim 17, where the first electrode layer of the cell faces the second electrode layer of the cell and/or wherein the barrier contacts the first and/or second electrode layers of the cell.

19. A method of making a switchable glazing unit comprising at least one glazing panel, the method comprising the steps:
  (i) providing a first sheet of glass having a thickness in the range of 0.5 mm to 12 mm and having a first major surface and a second opposing major surface;
  (ii) depositing at least one (a first) barrier on the first major surface of the first sheet of glass to delimit at least one (a first) portion of the first major surface of the first sheet of glass;
  (iii) positioning a layer of liquid crystal material on the first portion of the first major surface of the first glass sheet;
  (iv) providing a second sheet of glass having a thickness in the range of 0.5 mm to 12 mm on the first barrier such that the second sheet of glass faces the first sheet of glass;
  (v) curing the first barrier such that the first sheet of glass is joined to the second sheet of glass by at least the first barrier to form a mother sheet;
  (vi) providing a first glazing panel, either by removing the first portion bounded by the first barrier from the mother sheet by a cutting process to provide the first glazing panel comprising a first glass sheet and a second glass sheet, or by using the mother sheet as the first glazing panel; and
  (vii) joining the first glazing panel to a first sheet of glazing material with a perimeter seal;
  wherein the first and/or second sheet of glass of the first glazing panel has at least one edge having an edge strength greater than 50 MPa and/or wherein the first and/or second sheet of glass of the first glazing panel has at least one edge that has been coated with a sealing material.

20. A switchable glazing unit according to claim 1, wherein the first edge of the first and/or second sheet of glass has an edge strength between 100 MPa and 300 MPa.

21. A switchable glazing unit according to claim 1, wherein the first sheet of glass of the first glazing panel has a thickness in the range 4 mm to 12 mm and/or wherein the second sheet of glass of the first glazing panel has a thickness in the range 4 mm to 12 mm.

* * * * *